TRANSLUCENT PETROLEUM PLASTIC

Original Filed Jan. 21, 1938 3 Sheets-Sheet 1

Diagram to determine the penetration index of asphalts

Inventor: Alvin P. Anderson

By his Attorney: [signature]

Loss of color upon heating .34% solutions in benzene of petroleum plastics A & B having 40-50 penetrations Change in penetration upon heating of petroleum plastic A & B Inventor: Alvin P. Anderson By his Attorney: E. W. Anderson Inventor: Alvin P. Anderson By his Attorney: [signature]

Reissued May 12, 1942

Re. 22,093

UNITED STATES PATENT OFFICE 22,093

TRANSLUCENT PETROLEUM PLASTIC

Alvin P. Anderson, Berkeley, Calif., assignor to Shell Development Company, San Francisco, Calif., a corporation of Delaware Original No. 2,201,466, dated May 21, 1940, Serial No. 186,133, January 21, 1938. Application for reissue November 12, 1940, Serial No. 365,395

11 Claims. (Cl. 260—28)

Figure 1:
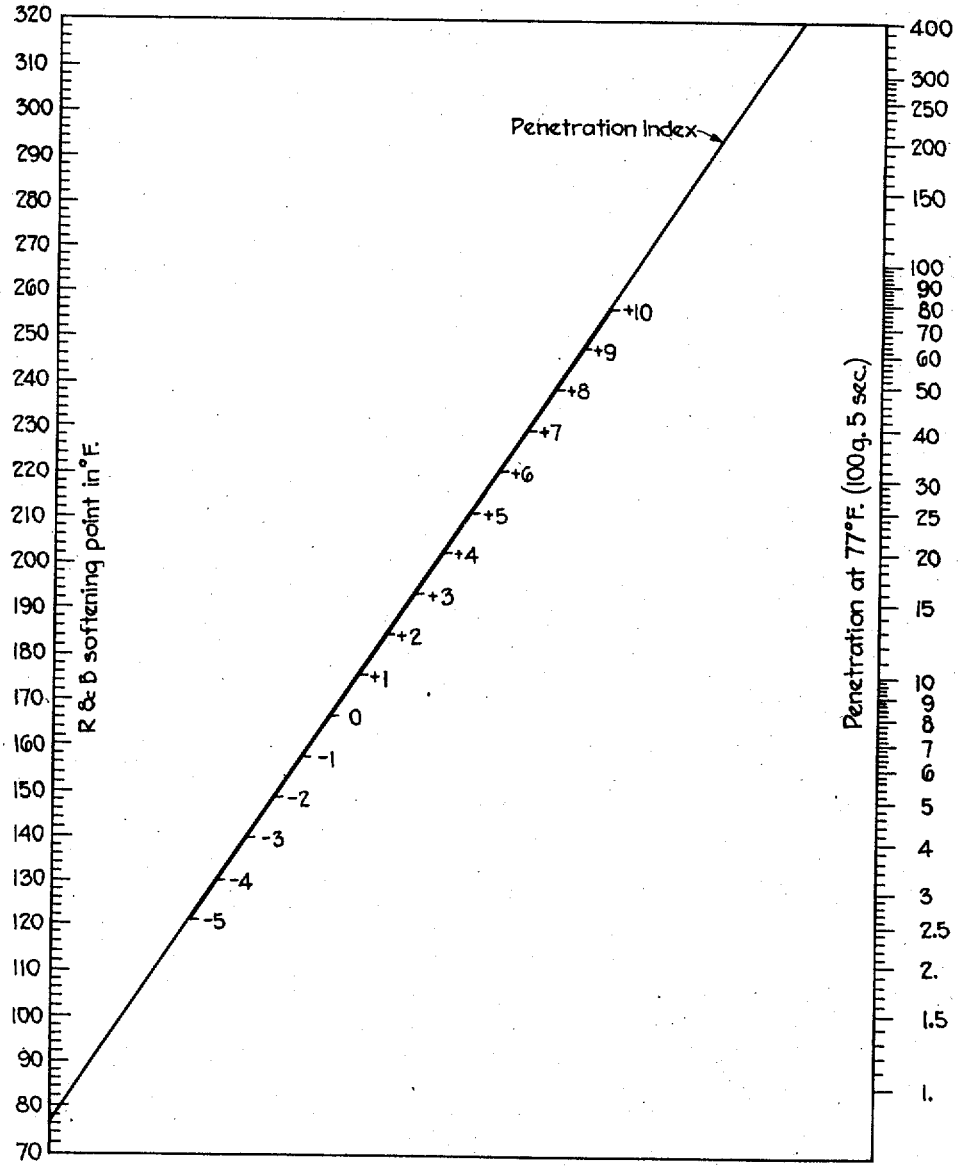

This invention deals with new and useful translucent plastic petroleum products, and more particularly is concerned with relatively light-colored asphaltic plastics having superior properties to those of similar products heretofore known.

It is known that petroleum oils consist of extremely complicated mixtures of different components which are chiefly of the paraffin, naphthene, and aromatic series. Owing to the complexity of these mixtures, however, little is known about the chemical structure of many of their members, particularly the heavier ones. Therefore, it is customary to characterize and describe different fractions of petroleum oils by their physical properties such as gravity, boiling range, viscosity, penetration, temperature susceptibility, color, solubility in different solvents, etc.

Fractionating petroleum oils by different methods or combination of methods, or by subjecting selected petroleum oils of certain types or characteristics and from certain sources to such fractionating methods, has made it possible to isolate petroleum fractions which are peculiarly suited for specific purposes; and often by introducing relatively minor changes into the methods of fractionation it has been possible greatly to improve the quality of the desired fractions for a given purpose, or even to produce fractions of entirely new properties.

It is known that by removing asphalts and low-boiling components from a typically naphthenic petroleum oil such as a California crude oil, extracting the remaining middle fraction with a so-called naphthenic solvent, i. e. a solvent such as liquid $SO_2$, phenol, cresylic acids, beta beta dichlor ethyl ether, nitrobenzene, furfural, etc., having a selective solvent power for non-paraffinic and particularly aromatic hydrocarbons, and then distilling the extract to remove vaporizable components, asphalt-like plastic materials have been obtained which have a relatively light color, are translucent, and completely soluble in acetone. These plastics are practically identical with certain light-colored natural asphalts heretofore known.

Translucent plastics or albino asphalts, as they are sometimes called, have wide utility. They may be used for pavings and more particularly for markings on paved roadways and the like, for roofs, paints, substitutes for resins, manufacture of linoleum, etc. While they are of various shades of green or brown to the reflected light, they are translucent in thin layers and may be colored brightly by admixture of suitable pigments, such as yellow ocher, terra-cotta, chromic oxide, ferric oxide, titanium white, lead white, lithopone, ultramarine blue, aluminum powder, etc. Unfortunately, however, the stability of these plastics is relatively poor, and upon exposure to atmospheric conditions for several months they turn black and lose their translucency.

The translucency of the plastic may be measured by determining the A. S. T. M. color of a .1% test solution of the plastic in a suitable substantially colorless solvent such as carbon tetrachloride, benzene, etc. In general, if the color of the test solution is below about 3½ A. S. T. M. the color of the plastic mixed with pigment is more or less bright. If the color of the test solution is substantially above 3½ A. S. T. M., the color of the plastic containing the pigment is dull, and may even be black. Ordinary asphalts produce .1% solutions in benzene or carbon tetrachloride having A. S. T. M. colors darker than 4½ and usually darker than 5.

It is the purpose of this invention to provide improved translucent petroleum plastics having properties superior to similar products known heretofore, and in particular possessing improved temperature susceptibilities and resistance to oxidation.

I have discovered that so-called naphthene base and, particularly, intermediate base petroleum oils such as are found in many of the Mid-Continent fields contain varying amounts of light-colored plastics other than the above which are excellently suited for the uses described above. These plastics, which are designated here plastics A, are similar in many respects to the known light-colored asphaltic plastics which are soluble in acetone and are referred to as plastics B. For instance, both plastics are substantially completely soluble in 86° A. P. I. naphtha, their contents of asphaltenes, i. e. components insoluble in 86° A. P. I. naphtha, being normally of the order of .5% and usually less than .1%. However, plastics A differ from plastics B in that they are substantially insoluble, i. e. less than about 25% soluble in equal volumes of acetone at 77° F., which indicates their different chemical composition, confirmed by the fact that plastics A are more stable against oxidation and have less tendency to crack when used in paints. They also differ from the known petroleum or asphaltic resins, as will be shown hereinafter.

For illustrative purposes, typical light-colored asphaltic A plastics produced from California and Mid-Continent lubricating stocks by solvent extraction with naphthenic solvents and distillation of the extracts are compared below with similar known acetone-soluble light-colored B petroleum plastics, both natural and produced from California crude.

*Table I*

| Type of the plastic | A | | | B | |
|---|---|---|---|---|---|
| Source of petroleum oil | California | Mid-Continent | | California | Natural |
| Solubility in 100% by volume acetone at 77° F. percent | 8 | 6 | 13 | 100 | 100 |
| Specific gravity | 1.040 | 1.023 | 1.020 | 1.069 | 1.042 |
| Penetration at 77° F., A. S. T. M. | 40 | 20 | 128 | 15 | 19 |
| Softening point (ring and ball) ° F., A. S. T. M. | 124 | 131.1 | 105.0 | 125.8 | 127.6 |
| Penetration index | −1.4 | −1.9 | −1.7 | −2.9 | −2.3 |
| Color A. S. T. M. of .1% solution of plastic in carbon tetrachloride | 1½ | 2½ | 2− | 2½+ | 3− |

The plastic B from California crude shown in Table I was obtained by following the procedure described in the Merrill U. S. Patent 2,081,496. A heavy lubricating distillate from Coalinga crude was extracted with liquid $SO_2$ to produce a raffinate fraction and an extract fraction. The extract fraction was distilled under substantially non-cracking conditions until the residue left in the still was substantially solid at normal atmospheric temperature and had plastic properties.

In order to produce the plastic A from the same crude it was necessary to re-extract the raffinate fraction produced above with a naphthenic solvent of greater solvent power than that of the first. Liquid $SO_2$ containing ⅓ its own volume highly aromatic kerosene extract was used. A small amount of a secondary extract fraction was obtained, which upon distillation to produce a plastic residue yielded the California plastic A shown in the table. It will thus be noted that merely by differently combining the known extraction and distillation procedures, a product was obtained having new properties which, as will be shown, are greatly superior to those of the known California and natural plastics of the type B.

A comparison of the plastics A and B in the table reveals essential differences in two important properties: gravity and penetration index. The relatively high gravities of plastics B indicate that they are of more aromatic character than plastics A, which are apparently to a large extent of naphthenic composition. Because of their aromaticity, plastics B are practically immiscible with polyisobutylene and similar chain polymers having molecular weights in excess of about 800 obtainable by polymerization of olefines. Admixture of such oil-soluble high molecular weight polymers to asphalts not only improves their temperature susceptibilities, but also increases their adhesiveness. Blends of plastics B with such polymers are unstable and separate upon prolonged standing. On the other hand, plastics A are capable of dissolving many of the high molecular weight polymers such as rubber, hydrogenated rubber, polymerized isobutylene, polymerized styrene, polymerized indene, etc., and upon prolonged standing, blends of plastics A with such polymers do not separate.

To illustrate the above, upon addition of 5% polyisobutylene having a molecular weight of about 3000 to plastic A having an A. S. T. M. penetration at 77° F. of 31 and a softening point of 123° F., a blend was obtained having a softening point of 134° F. and a penetration of 31. The penetration index has been improved from −2.0 to −.5.

From the point of view of quality of asphalts, penetration index is very important. It is a measure for temperature susceptibility of asphalts. A high penetration index signifies a low temperature susceptibility, i. e. a low variation in consistency over a given temperature range. Obviously, a high penetration index within the limits of satisfactory ductility is desirable in road asphalts and similar products.

Penetration indexes may be determined graphically from the A. S. T. M. penetration at 77° F. and the A. S. T. M. ring and ball softening point with the aid of the graph shown as Figure 1 in the attached drawings. By connecting the softening point on the left-hand scale with the penetration at 77° F. on the right-hand scale with a straight edge and marking the intersection with the oblique line carrying the penetration index scale, the desired result may be read from the latter. The penetration index can be readily obtained, also, by using a slide rule described in the Van Doormaal U. S. Patent 2,175,459.

Penetration indexes of my plastics are, in general, not below about −2.1, whereas acetone-soluble petroleum products have generally penetration indexes considerably below that figure.

Other important differences between petroleum plastics A and B were found in their boiling temperatures, relative resistance to oxidation, molecular weights, solubilities in liquid $SO_2$, etc. Plastics B are readily distillable and soluble in liquid $SO_2$, and are therefore in general prepared from naphthenic extracts of distillates, whereas plastics A are difficult to distil and therefore are generally prepared from residual oils to avoid excessive losses as well as cracking.

Figure 2:
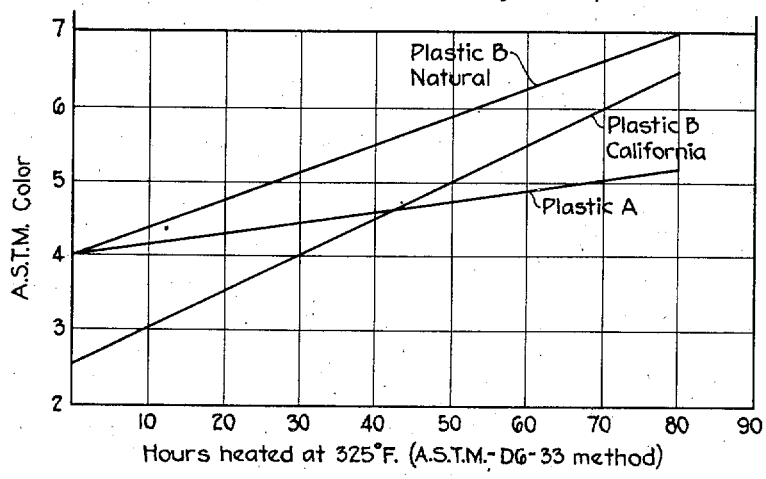

In Figure 2 of the drawings the changes of color are shown upon heating three 40–50 penetration light-colored asphaltic plastics, namely plastic A from a Mid-Continent crude which was 8% soluble in acetone, a plastic B from a naphthenic base crude, and a natural plastic B, under conditions of A. S. T. M. method D 6–33 for determination of loss on heating at 325° F. The colors were determined at several intervals during the heating period by making .1% solutions of the plastics in benzene. As will be noted, the color of the Mid-Continent plastic A darkens at a very much lower rate than either of the acetone-soluble natural or California products of the type B.

Figure 3:
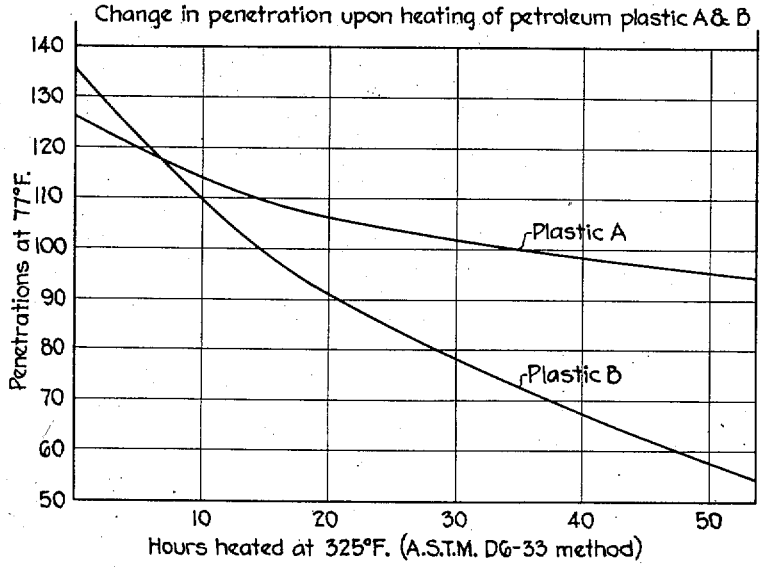

In Figure 3 is shown the change of penetration of two samples of plastics A and B having 120–140 penetration at 77° F., when heated under the conditions of the A. S. T. M. test D 6–33 at 325° F. for 50 hours. Vaporization losses for both products were below .6%. The B plastic hardened very much more rapidly than the A plastic. Moreover, it was found that the asphaltene contents before and after heating were as follows:

*Table II*

| Solubility of plastic in 100 volume percent of acetone at 77° F. | Asphaltene content— | |
|---|---|---|
| | Before heating | After 50 hours' heating at 325° F. |
| Plastic A, 12% soluble | .1 | .27 |
| Plastic B, 100% soluble | .1 | 3.32 |

I have found that as a general rule my plastics develop less than 1% and usually less than .5% asphaltenes upon heating for 50 hours at 325° F. under the conditions of the A. S. T. M. test D 6–33, whereas B plastics develop more than 2% and usually more than 3% asphaltenes under the same conditions.

Figure 4:
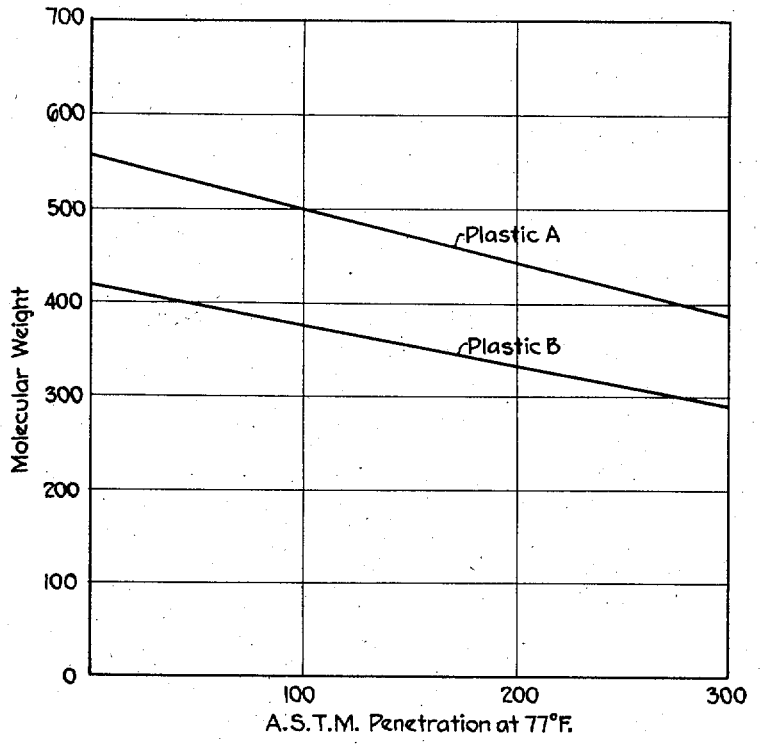

Plastics A have considerably higher molecular weights as determined by the cryoscopic method using benzene than plastics B of the same penetration, as is shown in Figure 4, where penetration is plotted against molecular weights for two typical plastics A and B. This difference in molecular weights largely accounts for the differences between the distillabilities of the two types of plastics. The curves in Figure 4 indicate that for penetrations at 77° F. up to about 300, the approximate relation of penetration and molecular weights is as follows:

For plastics A the sum of penetration at 77° F. plus 2 times molecular weight is greater than 1050;

For plastics B the sum of penetration at 77° F. plus 2 times molecular weight is smaller than 900.

When using the light-colored petroleum plastics in paints, it was further observed that in general paints containing B plastics deteriorate at a higher rate than similar paints containing A plastics. For instance, two samples of blue paint were made by mixing in a ball mill

| | Per cent |
|---|---|
| Translucent petroleum plastic | 27.4 |
| Cobalt naphthenate drier | 1.0 |
| White spirit | 5.6 |
| Stand oil | 1.0 |
| Ultramarine blue | 33.0 |
| Titanium white | 32.0 |

The only difference between the two samples was in the type of the plastic.

Pieces of thoroughly cleaned and sandblasted metal were coated with the paints and exposed to sun and air. It was found that after 5 days of exposure the paint containing B plastic had cracked and developed brown spots, whereas the product containing plastic A had remained unchanged.

In order to determine how far acetone-insoluble asphaltic resins were responsible for the superior properties of the A petroleum plastics, an A plastic, less than 10% soluble in acetone, derived from a Mid-Continent lubricating residue, was mixed with an excess of silica gel and the resulting mixture was extracted in a Soxhlet apparatus with 88° A. P. I. naphtha. According to Kalichevsky and Fulton, National Petroleum News 23, pages 33 to 36, December 23, 1931, asphaltic resins are retained by solid adsorbents, such as fuller's earth and the like. A resin-free extract fraction so obtained after removal of the naphtha had the following properties in comparison with the original plastic containing the resin:

*Table III*

| Plastic | Freed from resins | Original containing resins |
|---|---|---|
| Specific gravity | 1.010 | 1.023 |
| Penetration at 77° F | 143 | 19 |
| Softening point (ring and ball) | 101.5 | 127 |
| Penetration index | −2.0 | −2.3 |
| Color A. S. T. M. (.1% solution in carbon tetrachloride) | 1 | 2½ |
| Molecular weight | 485 | 545 |
| Solubility at 77° F. in equal volume of acetone | 4.5 | 6.6 |

Plastics A as produced from deasphalted paraffinic residues usually contain between about 10% to 40% asphaltic resins as determined by the clay adsorption method of Kalichevsky and Fulton cited above, the exact amount being very difficult to determine because of inherent inaccuracies in the method.

The light-colored A plastics freed from resins are translucent, hard, glossy solids of asphalt-like texture. As will be noted, they have better colors and penetration indexes than the same plastics containing resins, and consequently have lower temperatures susceptibilities and better colors than the resins themselves. Asphaltic resins are in general dark-colored substances, and solutions of .1% in carbon tetrachloride or benzene have A. S. T. M. colors normally considerably darker than 3½, and often darker than 6 or 7. The fact that resins are adsorbed by clay and the like while the true plastics A are not indicates that the two classes of substances have entirely different chemical structures. This contention is further borne out by differences between their distillabilities and ductilities, as shown below. Moreover, the asphaltic resins in the natural plastic mixtures of the type A obtained from residual oils by the methods described later have considerably higher molecular weights than the true plastics A themselves. On the other hand, the molecular weight-penetration relationship hereinbefore disclosed does not materially change upon deresinification.

As pointed out before, plastics A are more difficult to distil than plastics B. For instance, when it was attempted to vacuum distil a plastic A having an original penetration at 77° F. of 21 and a solubility in equal volumes of acetone at 77° F. of 8%, not more than about 35% could be distilled without substantial cracking, even though a vacuum of the order of .1 to .3 mm. mercury was maintained. The overhead product had a penetration of 151 at 77° F. and was 17% soluble in an equal volume of acetone. Materially larger percentages of plastic A can be distilled when employing molecular distillation methods under vacua of $10^{-4}$ mm. mercury lower at temperatures above about 500° F. and below incipient cracking, i. e. below about 625° F. The distance between the heating and cooling surfaces in the molecular distillation apparatus may conveniently range between about ½ and 10 cm. Under these conditions asphaltic resins remain largely undistilled and are thus effectively separated from the true plastics A without incurring cracking.

Plastics of the type A containing substantial quantities of asphaltenes are difficult, if not impossible, to distil in molecular stills except in small amounts because of rapid gum and coke deposition on the heating surfaces at the temperatures necessary for the distillation. Therefore, in order to produce substantial amounts of distilled plastics A, it is necessary to charge to the molecular still a material which contains the desired plastics and is substantially free from asphaltenes, i. e. a solution of the charging stock in benzene or carbon tetrachloride containing .1% of the plastic A should have a color not substantially darker than 3½ A. S. T. M.

The distilled plastics A are clear, glossy, transparent materials substantially identical with those obtained when removing resins by adsorption on clay. They have green fluorescence and resemble in appearance solidified paraffinic bright stocks. They may have colors without dilution as light as 8 A. S. T. M. and lighter, and normally are lighter than about 4 A. S. T. M. in 1.0% solutions of carbon tetrachloride or benzene. Solubilities in acetone of the distilled and undistilled grades are substantially the same.

In Table IV the results of distilling a typical plastic A by molecular distillation are shown. A vacuum of $10^{-4}$ to $10^{-5}$ mm. mercury was maintained while distilling.

*Table IV*

| Distillation temperature, ° F | | 495 | | 563 | | 593 | |
|---|---|---|---|---|---|---|---|
| Plastic A | Original | Distillate | Residue | Distillate | Residue | Distillate | Residue |
| Yield | | 42.5 | 55.6 | 60.3 | 39.7 | 63.6 | 36.4 |
| Penetration at 77° F | 21 | 83 | 3 | 61 | 1 | 54 | 1 |
| Softening point, ° F | 128 | 109 | 150 | 113 | 163 | 114.5 | 164.5 |
| Penetration index | −2.1 | −2.0 | −2.5 | −2.0 | −2.7 | −2.1 | −3.0 |
| Color (1.0% solution in carbon tetrachloride) | | 2½ | 7 | 3+ | 8 | 3½ | 8 |
| Color (.1% solution in carbon tetrachloride) | 2½ | 1½ | 3 | 1½+ | 3½+ | 1½ | 4 |
| Ductility at 77° F | 100+ | 100+ | 0 | 100+ | 0 | 100+ | 0 |

As will be noted above, the distillation residues comprising predominantly resins are relatively hard, possessing penetration indexes of −2.5 and lower and ductilities of 0, whereas the true plastics A substantially free from resins are softer and have penetration indexes not below −2.1 and ductilities of 100+.

Coming now to the manufacture of the plastics A, their chief sources are intermediate base petroleum oils. However, paraffin base as well as naphthene base petroleum oils may contain varying amounts thereof, as hereinbefore indicated, and their recovery depends upon the proper combination of steps which may vary for different types of petroleum oils.

Typically naphthene base crude oils yield mostly acetone-soluble plastics B which may be isolated according to the procedure described in the Merrill U. S. Patent 2,081,496. Small amounts of plastics A, however, may be recovered by further extracting the raffinate produced in the first extraction with a suitable naphthenic solvent and distilling the small amounts of a secondary extract so obtained until a plastic residue is formed as hereinbefore described in connection with plastics made from California crude, shown in Table I.

In contrast to naphthenic stocks, asphalt-free heavy Mid-Continent primary extracts may yield upon distillation plastics of the A type. Whether or not secondary extraction of the primary raffinate as described for naphthenic distillates is necessary in the manufacture of my A plastics depends largely upon the composition of the petroleum oil from which the starting material is obtained. According to Bureau of Mines Report of Investigation 3279 on "Base of a Crude Oil" (September 1935) seven bases of petroleum oils may be distinguished, namely A—paraffin base
B—paraffin intermediate base
C—intermediate paraffin base
D—intermediate base
E—intermediate naphthene base
F—naphthene intermediate base
G—naphthene base As a general rule, upon extraction with certain naphthenic solvents, heavy lubricating stocks such as cylinder oils, substantially free from asphaltenes, and belonging to the classes A to D, yield extract fractions, normally solid distillation residues which are substantially insoluble in acetone; whereas heavy stocks of classes E to C usually contain sufficient amounts of acetone-soluble plastic compounds so that naphthenic extract fractions yield upon distillation plastics which are largely or completely soluble in equal volumes of acetone.

Heavy extract fractions which upon distillation yield residual plastics of the type A are normally substantially insoluble in equal volumes of liquid $SO_2$ at about 32° F., and therefore, in order to prepare such extract fractions, naphthenic solvents having solvent powers greater than liquid $SO_2$ are ordinarily employed. Furfural, beta beta dichlor ethyl ether, phenol, cresylic acids, nitrobenzene, etc., or mixtures thereof, are usually satisfactory in that the heavy extract fractions which contain the plastic A are soluble in about equal volumes thereof under the extraction conditions normally employed when treating heavy oils with these solvents.

Removal of asphalt from petroleum oils containing same and substantial amounts of plastic A is preferably carried out by treatment with propane and/or butane, if desired, in admixture with methane or ethane, under conditions to produce a deasphalted oil which is completely soluble in 86° A. P. I. naphtha. Ordinary vacuum distillation may be used under some circumstances for separating the asphalts. However, this may result in injury to and considerable losses of the desired plastics A, particularly the harder grades, since the latter are practically non-distillable under non-cracking conditions by ordinary distilling means, even under extreme vacuum and in the presence of steam, as has been pointed out hereinbefore. Therefore I prefer to prepare my plastics from undistilled petroleum oils of classes A to D, i. e. petroleum oils such as residual cylinder stocks which may have been topped but never have been taken overhead.

Deasphalted lubricating stocks of the classes B to D, and occasionally of class A, are extracted commercially with naphthenic solvents having solvent powers of the order of that of phenol, or pairs of paraffinic and such naphthenic solvents for the separation of paraffinic raffinates and naphthenic extracts. As produced by the modern efficient extraction methods, these extracts from intermediate base oils are substantially insoluble in liquid $SO_2$ at 32° F., in contrast to the unextracted stocks of similar viscosity indexes obtained by distillation from naphthenic crudes, a large portion of which is normally soluble in liquid $SO_2$ at 32° F.

In general, the more paraffinic the base of the petroleum oil is, the higher is the viscosity index of the extract fraction produced therefrom, the lower is its solubility in liquid $SO_2$, and the better suited it is for the production of my light-colored plastics. Thus I have prepared extract fractions by extraction of Oklahoma City, Seminole, Ranger, Marshall, Burbank, Tonkawa, etc., deasphalted, undistilled lubricating oil stock, which extract fractions were substantially insoluble in an equal volume of liquid $SO_2$ at 32° F. and upon distillation yielded plastic residues having solubilities in equal volumes of acetone at 77° F. and in 250% by volume liquid $SO_2$ at 45° F., respectively, as follows:

*Table V*

| Penetration at 77° F. of plastic | Solubility in— | |
|---|---|---|
| | Equal volume of acetone at 77° F. | 250% by volume liquid $SO_2$ at 45° F. |
| Below 50 | Below 10% | Below 20%. |
| Between 50 and 150 | Below 15% | Below 30%. |

If desired, plastics A produced in the above manner may be separated by extraction with liquid $SO_2$ to produce a residual plastic A raffinate, insoluble in liquid $SO_2$, which has improved properties and is substantially free from substances having the properties of plastic B. For example, a typical plastic A was subjected to extraction with 250% by volume liquid $SO_2$ at 45° F. with the following results:

*Table VI*

| Plastic A | Original | Raffinate fraction | Extract fraction |
|---|---|---|---|
| Penetration at 77° F. | 114 | 148 | 15 |
| Softening point, R & B | 105 | 102 | 129 |
| Penetration index | −1.9 | −1.7 | −2.4 |
| Color (A. S. T. M. .1% solution in carbon tetrachloride) | 2+ | 2− | 2½+ |
| Yield, percent by weight | 100 | 76 | 24 |

As will be noted, the raffinate from the above extraction has an improved penetration index. It was found to be practically insoluble in an equal volume of acetone at 77° F.

Distillation of the extract to produce a residue substantially solid at normal atmospheric temperatures and having the desired penetration should be carried out under non-cracking conditions, preferably under high vacuum and/or in the presence of steam. Cracking of the plastics begins at about 625° F. Or, I may fractionate the deasphalted stock prior to extraction to produce a heavy residual oil such as a cylinder oil, and then extract this residue with a naphthenic solvent having a solvent power greater than liquid $SO_2$, to produce directly, without further distillation, a plastic of the desired penetration.

Other methods of successful separation of the desired light-colored petroleum plastics may comprise treating dewaxed petroleum oils, or heavy distillates thereof, or even naphthenic extracts of intermediate base petroleum oils containing, if desired, black asphalts and/or substantial amount of aromatic fractions, with hydrocarbon or other suitable gases such as methane, ethane, propane, carbon dioxide, etc., at high pressures. For instance, an extract having a specific gravity of 1.015 obtained by countercurrent extraction of a Mid-Continent deasphalted undistilled lubricating stock with propane and cresylic acids was treated with 350 volume % of butane under a $CO_2$ pressure of 550 lbs. at 140° F. 20% of a dark precipitate was separated and the resulting raffinate was distilled to produce a plastic residue having the following properties:

*Table VII*

| | |
|---|---|
| Solubility in equal volume of acetone at 77° F. | 8% |
| Penetration A. S. T. M. at 77° F. | 48 |
| Softening point (ring and ball) | 117.1° F. |
| Penetration index | −2.1 |
| Color A. S. T. M. (.1% solution in carbon tetrachloride) | 2 |

In another series of experiments, a dewaxed Mid-Continenet deasphalted stock having a Saybolt Universal viscosity at 210° F. of 105 seconds and a pour point of −10° F. was fractionated by treating same with 530% by volume of a methane-propane mixture at 68° F. and under a pressure of 800 lbs. The residue amounting to 25% of the charge was dissolved in 540 volume % liquid butane at 20° C. A precipitate equal to .8% of the oil was discarded. The raffinate amounting to 34.2% of the oil was further fractionated by stepwise introducing natural gas at increasing pressures of 700 lbs., 800 lbs., and 900 lbs., respectively, and separating the precipitated fraction after each addition of gas. The three precipitates so obtained had the following properties:

*Table VIII*

| Precipitate | 1st | 2nd | 3rd |
|---|---|---|---|
| Yield (percent of oil) | 2.0% | 2.2% | 2.3% |
| Penetration at 77° F. | 20 | 41 | 130 |
| Softening point (ring and ball), ° F. | 130.1 | 122.1 | 105.5 |
| Penetration index | −1.8 | −1.6 | −1.4 |
| Color A. S. T. M. (.1% solution in carbon tetrachloride) | 3½ | 3 | 3 |
| Solubility in equal volume of acetone at 77° F. | 5% | 7% | 12% |

I claim as my invention:

1. A natural petroleum plastic, translucent in thin layers, substantially free from asphaltenes, substantially solid at atmospheric temperature, substantially completely soluble in 86° A. P. I. naphtha, more than 75% insoluble in an equal volume of acetone at 77° F., and having a temperature susceptibility lower than that of asphaltic resins.

2. A natural petroleum plastic, translucent in thin layers, substantially free from asphaltenes, substantially solid at room temperature, substantially completely soluble in 86° A. P. I. naphtha, more than 75% insoluble in an equal volume of acetone at 77° F., and having a penetration index not lower than −2.1.

3. A natural petroleum plastic, translucent in thin layers, substantially free from asphaltenes, substantially solid at room temperature, substantially completely soluble in 86° A. P. I. naphtha, more than 75% insoluble in an equal volume of acetone at 77° F., substantially resistant to oxidation and having a ductility at 77° F. of 100+.

4. A natural petroleum plastic, translucent in thin layers, substantially free from asphaltenes, substantially solid at atmospheric temperature, substantially completely soluble in 86° A. P. I. naphtha, having an A. S. T. M. penetration below 50, a solubility at 77° F. in an equal volume of acetone below 10%, and a temperature susceptibility lower than that of asphaltic resins.

5. A natural petroleum plastic substantially solid at atmospheric temperature, substantially free from asphaltenes and asphaltic resins, completely soluble in 86° A. P. I. naphtha, more than 75% insoluble in an equal volume of acetone at 77° F. and having an A. S. T. M. color of 8 or lighter.

6. A natural petroleum plastic, translucent in thin layers, substantially free from asphaltenes, substantially solid at room temperature, substantially completely soluble in 86° A. P. I. naphtha, more than 75% insoluble in an equal volume of acetone at 77° F., and containing less than 40% asphaltic resins.

7. A natural petroleum plastic, translucent in thin layers, substantially free from asphaltenes, substantially solid at room temperature, substantially completely soluble in 86° A. P. I. naphtha, containing less than 40% asphaltic resins, having an A. S. T. M. penetration at 77° F. below 300 and a relation of penetration to molecular weight: A. S. T. M. penetration at 77° F. plus 2 times molecular weight is greater than 1050.

8. A natural petroleum plastic comprising a naphthenic extract fraction substantially insoluble in an equal volume of liquid $SO_2$ at 32° F. obtained from an intermediate base undistilled heavy mineral cylinder oil substantially free from asphaltenes, said plastic being translucent in thin layers, substantially solid at atmospheric temperature, substantially completely soluble in 86° A. P. I. naphtha, more than 75% insoluble in an equal volume of acetone and having a ductility at 77° F. of 100+.

9. As a new composition of matter a natural petroleum plastic and a high molecular weight hydrocarbon polymer, said petroleum plastic being translucent in thin layers, substantially free from asphaltenes, substantially solid at atmospheric temperature, substantially completely soluble in 86° A. P. I. naphtha, more than 75% insoluble in an equal volume of acetone at 77° F. and having a temperature susceptibility lower than that of asphaltic resins.

10. As a new composition of matter a natural petroleum plastic and a high molecular weight aralkyl hydrocarbon polymer, said petroleum plastic being translucent in thin layers, substantially free from asphaltenes, substantially solid at atmospheric temperature, substantially completely soluble in 86° A. P. I. naphtha, more than 75% insoluble in an equal volume of acetone at 77° F., and having a temperature susceptibility lower than that of asphaltic resins.

11. As a new composition of matter a natural petroleum plastic and a styrene polymer, said petroleum plastic being translucent in thin layers, substantially free from asphaltenes, substantially solid at atmospheric temperature, substantially completely soluble in 86° A. P. I. naphtha, more than 75% insoluble in an equal volume of acetone at 77° F. and having a temperature susceptibility lower than that of asphaltic resins.

ALVIN P. ANDERSON.